March 8, 1955     O. J. POUPITCH     2,703,418
METHOD OF PRODUCING NUT AND WASHER ASSEMBLIES
Filed Oct. 23, 1951     2 Sheets-Sheet 1
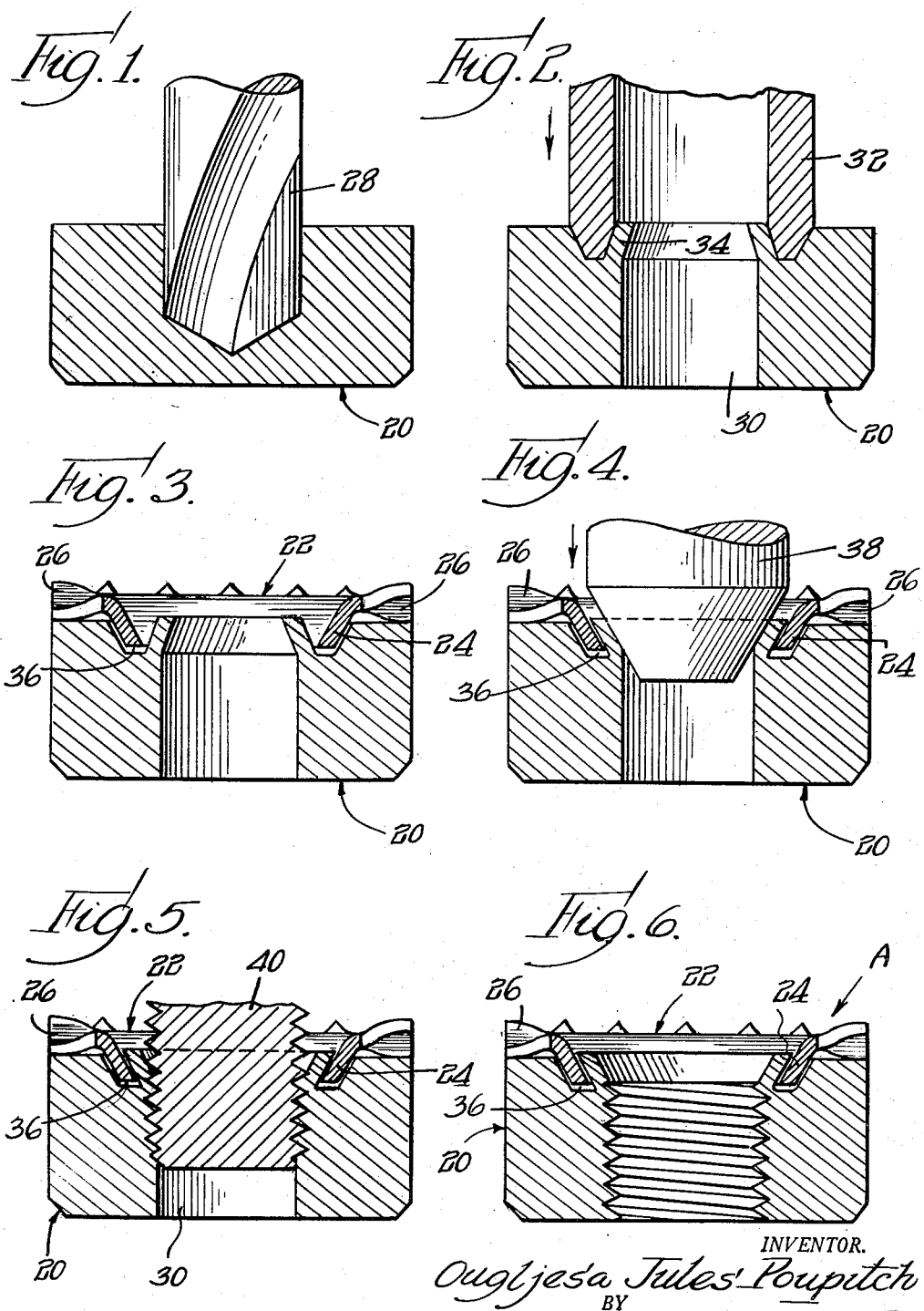
INVENTOR.
Ougljesa Jules Poupitch March 8, 1955     O. J. POUPITCH     2,703,418
METHOD OF PRODUCING NUT AND WASHER ASSEMBLIES
Filed Oct. 23, 1951     2 Sheets-Sheet 2
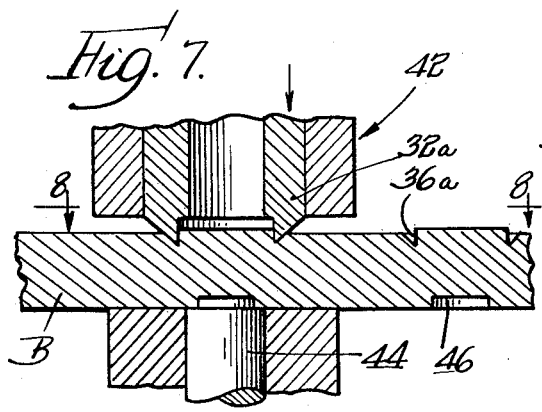
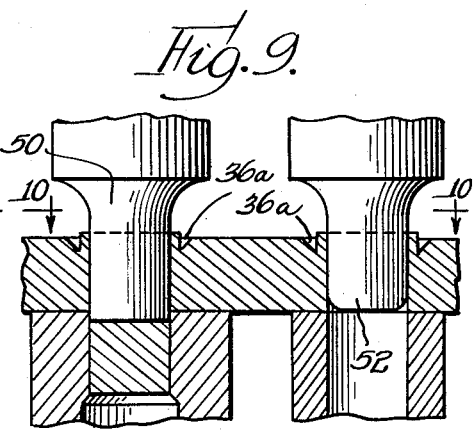
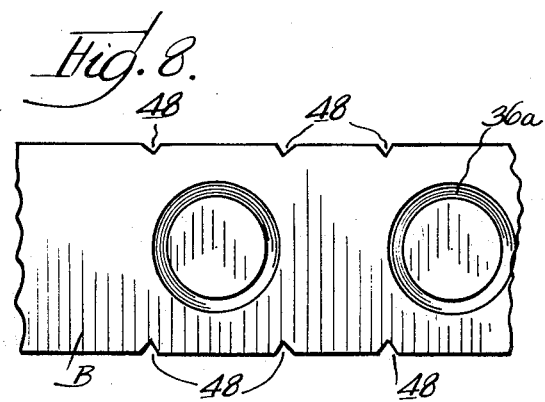
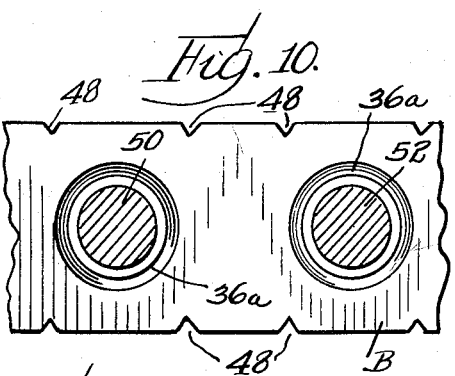
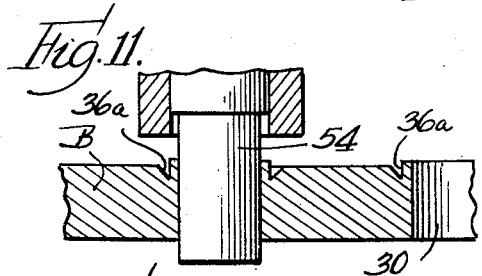
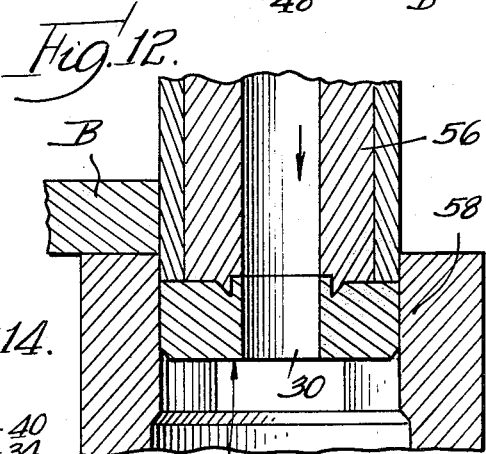
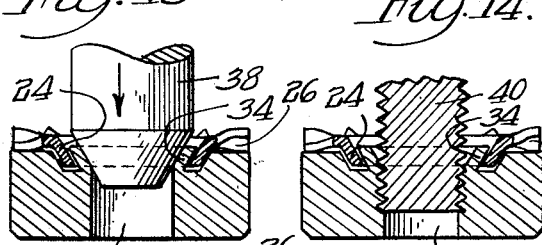
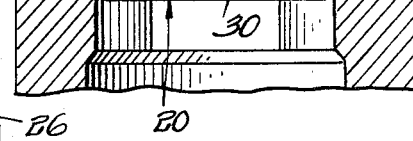
INVENTOR.
Ougljesa Jules Poupitch
BY
Moore, Olson & Trexler
Attys United States Patent Office 2,703,418
Patented Mar. 8, 1955

2,703,418

METHOD OF PRODUCING NUT AND WASHER ASSEMBLIES

Ougljesa Jules Poupitch, Itasca, Ill., assignor to Illinois Tool Works, Chicago, Ill., a corporation of Illinois Application October 23, 1951, Serial No. 252,590

2 Claims. (Cl. 10—86)

This invention relates generally to a method for producing nut and washer assemblies.

The present invention is a continuation-in-part of applicant's copending application, Serial No. 106,255, filed July 22, 1949, for Fastener Unit now Patent No. 2,576,906, issued November 27, 1951. The above mentioned copending application is directed to fastener units consisting of a preassembled nut and washer, whereas the present application is directed specifically to methods and means for producing such preassembled nuts and washers.

The clamping surface of conventional nuts is rather limited in area, and hence presents a difficult problem in attempting to bring about preassembly without impairing the locking effectiveness of this rather limited clamping surface area. The present invention contemplates the provision of an annular recess in the clamping surface of a nut to accommodate a complementary conoidal body of the washer length. It is important, therefore, that this annular recess be as small in cross-section as possible and yet insure positive securing of the washer body against separation from the nut. It is further contemplated that this annular recess be produced by a punch, as distinguished from a cutting operation, and it is therefore important that the recess be held to a minimum depth in order to assure the longest possible tool life.

It is therefore an important object of the present invention to provide a new and improved method, whereby preassembled nuts and washers may be produced in such a manner that an annular recess may be punched or stamped in the surface of a nut and the conical body of a washer subsequently inserted therein, the inner wall defining the punched recess extending beyond the clamping surface of the nut and swaged radially outwardly into overlapping relation with respect to the conoidal washer body.

More specifically it is contemplated that in the practice of the above mentioned method simultaneously with the punching operation which produces the annular recess, the inner wall or skirt adjacent the threaded portion of the nut be axially elongated sufficiently to provide stock for holding the washer against separation from the nut after the free margin of said skirt has been forced radially outwardly beneath the conoidal washer body.

It is also an object of the present invention to provide a new and improved method of producing preassembled nuts and washers, wherein the nut may be made from bar stock having the peripheral shape of a nut.

The foregoing and other objects and advantages will be more apparent from the following detailed description, when considered in connection with the accompanying drawing, wherein—

Figs. 1 to 6, inclusive, disclose successive steps in a method which is particularly applicable in instances where the nut portion of the assembly is to be produced from bar stock, as for example, hexagonal stock of the shape shown in these figures—Fig. 1 disclosing the first step of drilling the hole in a portion of stock which has been severed from the above mentioned bar; Fig. 2 disclosing the groove punching step; Fig. 3 disclosing the telescopic association of the conoidal washer body with the previously punched recess; Fig. 4 disclosing the step of forcing the free extremity of the inner wall or skirt radially outwardly so as to secure the washer and nut members against axial separation; Fig. 5 disclosing the step of tapping the thread in the previously drilled hole of the nut; and finally, Fig. 6 disclosing the completed assembly, all of the previous views being shown in central cross-section taken along the nut axis.

Referring now to the drawings more in detail wherein like numerals have been employed to designate similar parts throughout the various figures, it will be seen from Fig. 6 that the preassembled nut and lock washer capable of being produced by practicing the method of the present invention is designated generally by the letter A. Each fastener unit or preassembled nut and lock washer A includes a nut designated generally by the numeral 20 and a washer member designated generally by the numeral 22. The washer member 22 consists of a continuous conoidal inner body 24 and a plurality of locking elements or prongs 26 extending radially outwardly from the base of said conoidal body, each of the prongs providing teeth normally projecting beyond the bounding planes of the roots of the prongs 26, the teeth on one side of said bounding planes being adapted to engage the clamping surface of a nut, and the teeth on the opposite side being adapted to engage a complementary work surface.

Bearing in mind the structural nature of the preassembled nut and washer which is to be produced by the practice of the methods contemplated by the present invention, consideration will be given first to the method illustrated in Figs. 1 to 6, inclusive. As previously set forth, nuts may be produced from a long bar of stock which in cross-section conforms substantially in shape with the peripheral contour of the nut ultimately to be used in the assembly. Figs. 1 to 6, inclusive, represent steps in a method particularly adaptable for use in the manufacture of preassembled nuts and washers, wherein the nut element is to be produced from bar stock. It will be assumed that a section of hexagonal stock has been severed so as to present a nut blank as shown in central transverse section of Fig. 1, which blank is ultimately to take the form of the nut 20. The first step is to form a central aperture in the blank as by use of a conventional drill 28. After the drilling operation has been completed so as to form an aperture 30, an annular punch 32 disposed concentrically to the axis of the aperture 30 is pressed against the face of a nut blank which is ultimately to form the clamping surface of the nut 20. In applying this axial pressure to the nut stock an inner annular skirt 34 is presented. The pressure in this vicinity which is exerted by the tool 32 causes this skirt to experience a slight inward deflection as well as an axial elongation. The inward deflection of the skirt can be avoided by the use of a mandrel (not shown) positioned within the aperture 30 during the punching operation. The axial elongation of the skirt 34 is of particular significance as will appear as the description progresses.

The annular recess 36 resulting from the action of the punch 32 is now in readiness to accommodate the continuous conoidal body 34 of the lock washer 22, as illustrated in Fig. 3. Following the telescopic association of the conoidal washer body 24 and the nut recess 36, a suitable punch or tool 38 may be applied, Fig. 4, the extremity of which is tapered so as to cause outward radial deflection of the free margin of the skirt 34 from the position shown in Fig. 3 to the position shown in Fig. 4. This causes the skirt 34 to be shifted into overlapping relation with respect to the conoidal body 24, thereby providing a shoulder which prevents axial separation of the lock washer from the nut body. It is of importance to note that the increased axial elongation of the skirt 34 which took place as a result of the punching action of the tool 32 as previously described, affords a very essential increase in washer holding stock. Furthermore, it enables the use of a recess of minimum depth which is of importance in giving the longest possible usable life to the tool 32.

After the lock washer has been assembled with the nut blank, as shown in Fig. 4, a tap 40 is turned within the nut aperture 32 as shown clearly in Fig. 5. This tapping operation completes the production of the preassembled nut and lock washer, and the completed assembly is shown in central longitudinal cross-section in Fig. 6.

From the foregoing it will be apparent that the present invention contemplates very practical methods of producing preassembled nuts and washers. By forming the annular washer accommodating nut recess by the application of pressure, as distinguished from a machine operation, the cost of producing the recess is reduced to an absolute minimum. By so applying pressure to the clamping face of the nut blank by a tool of annular cross-section as previously described, a relative shallow groove may be produced because the axial elongation of the skirt affords added holding stock which otherwise could only be obtained by making a relatively deep recess in the nut face. Tools employed in making recesses as contemplated by the present invention are subjected to severe operating conditions, and this invention reduces the severity of the blow against the nut face by only requiring the tool to produce a relatively shallow recess. Hence, the invention contributes materially to the longevity of the punch. All of the steps contemplated by the methods described herein can be practiced in successive order and by the use of conventional metal working machines.

While certain specific steps in the process or method of producing preassembled nuts and washers, as well as means whereby such steps may be carried out, have been described herein, it will be apparent that the invention is capable of other modifications and changes coming within the scope of the appended claims.

The invention is hereby claimed as follows:

1. The method of producing pre-assembled nuts and washers wherein the washer member is provided with a conoidal annularly disposed body portion, said method including the step of applying pressure axially and along an annular area of limited width on the clamping face and adjacent the aperture of a nut blank so as to form an annular recess bounded radially outwardly by a wall presenting a flared mouth in said clamping face and bounded radially inwardly by a wall separated from said nut blank aperture by an annular skirt of such limited radial thickness as compared with the over-all radial thickness of the apertured nut blank as to simultaneously cause said skirt to be elongated axially so as to position the free margin thereof beyond the plane of the clamping face of the nut blank, telescopically associating the conoidal body of a washer with said annular recess so as to position the outer surface of said washer body in superimposed relation with respect to said flaring wall, and then applying pressure radially outwardly to said elongated skirt so as to force the free margin thereof into overlapping relation with respect to the complementary inner surface of the conoidal washer body sufficiently to secure said body against unauthorized axial separation with respect to the nut blank and maintaining sufficient clearance between the conoidal washer body and the wall surfaces defining said annular recess to permit relative rotation between the nut blank and washer, and forming threads in the wall defining the aperture of the nut blank of a depth which will not completely traverse said skirt.

2. The method of producing pre-assembled nuts and washers as set forth in claim 1 wherein during the application of axial pressure to form the annular recess, the resulting oppositely disposed annular walls defining said recess are inclined in opposite directions with respect to the axis of the nut blank.

References Cited in the file of this patent

UNITED STATES PATENTS

| | | |
|---|---|---|
| 1,670,296 | Beck | May 22, 1928 |
| 2,054,187 | Almdale | Sept. 15, 1936 |
| 2,576,906 | Poupitch | Nov. 27, 1951 |